(No Model.)

E. HAYS.
NUT LOCK.

No. 513,393. Patented Jan. 23, 1894.

Witnesses:
Harry B. Rohrer
Geo. T. Cruse

Inventor:
Elijah Hays.
By Knight Bros
Attys.

THE NATIONAL LITHOGRAPHING COMPANY,
WASHINGTON, D. C.

UNITED STATES PATENT OFFICE.

ELIJAH HAYS, OF WARSAW, INDIANA.

NUT-LOCK.

SPECIFICATION forming part of Letters Patent No. 513,393, dated January 23, 1894.

Application filed May 13, 1893. Serial No. 474,091. (No model.)

*To all whom it may concern:*

Be it known that I, ELIJAH HAYS, a citizen of the United States, residing at Warsaw, in the county of Kosciusko and State of Indiana, have invented certain new and useful Improvements in Nut-Locks, of which the following is a specification.

My invention relates to improvements in nut locks, employing a locking pin which fits into registering perforations formed in the nut and washer to prevent the said nut from turning on the bolt, and my invention consists broadly of a nut and washer which may be either formed integral or separately, and provided with registering perforations, and a locking pin, which fits into said perforations and engages an indentation in the fish-plate or other object against which the washer fits. The perforation through the washer is screw-threaded so as to engage a screw-threaded portion of the pin for retaining it in position.

Figure 1:
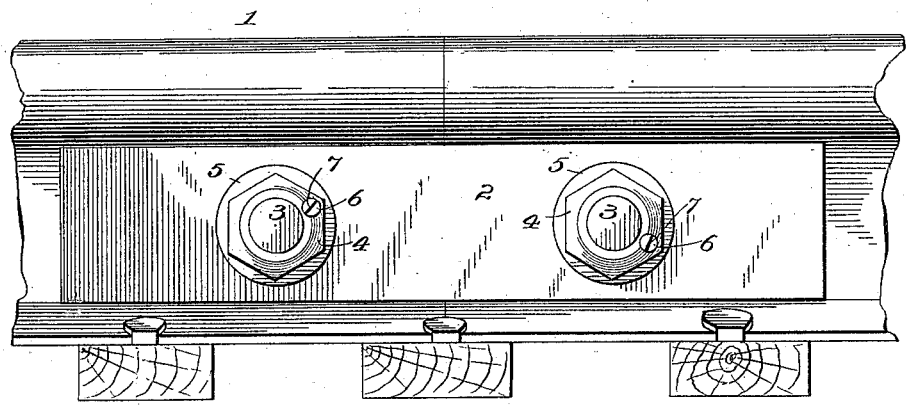
Figure 2:
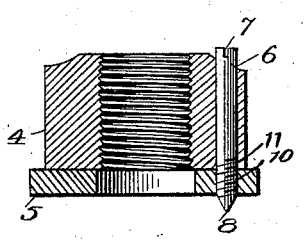
Figure 3:
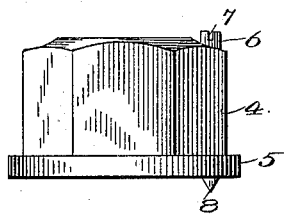

In the accompanying drawings, Figure 1 represents a front view of my improved nut lock applied to a fish-plate and rail. Fig. 2 represents a vertical cross-section, and Fig. 3 is a side view of the said nut lock.

In the said drawings: 1 is a railway rail, and 2 the fish-plate applied to the rail and held thereto by means of the bolt 3 and nut 4.

5 represents a washer against which the nut bears, or the said washer may be formed integral with the nut 4.

6 represents a locking pin provided with a nick 7 for the reception of a screw driver and a tapered end 8 which fits into an indentation in the fish plate formed by a prick punch.

8 is the screw-threaded lower end of the locking pin which engages with a corresponding screw-thread formed in the perforation 10 in the washer 5.

11 is an opening formed in the nut 4, which, when the nut is forced against the washer 5 registers with the opening 10 in the said washer in order that the locking pin may pass through the said openings.

My improved nut lock is operated in the following manner: The fish-plates are placed in the proper positions on the rail, the bolts passed through the usual openings formed in the rails, and the washer and the nut placed upon the bolts and forced against the fish-plate. If the washer and nut are formed separately they are placed upon the bolt in such a manner that the openings in the said nut and washer will register. After the washer and nut have been forced tightly against the fish-plate, a prick punch is inserted in the openings and a sharp blow given to it, so as to form an indentation in the fish-plate. The punch is then removed and the locking pin inserted in the openings and forced into the indentation in the fish-plate. The pin is held in the said indentation and prevented from being accidentally removed therefrom by means of the screw-thread on the pin engaging with the screw-thread formed in the opening in the washer. Thus it will be seen that the nut cannot be removed or become loosened on the bolt until the locking pin is removed.

Having thus described my invention, what I claim as new therein, and desire to secure by Letters Patent, is—

1. In a nut lock, the combination of a rail, a fish plate fitting on said rail, a bolt passing through said fish-plate and rail, a nut and washer formed with openings adapted to register with each other and fitting on said bolt against the fish-plate, a screw-thread formed in the opening in the washer, and a locking pin provided with a pointed and screw-threaded lower end, fitting in openings in the nut and washer, the point on the end engaging with the fish-plate and the screw-thread with the screw-threaded opening in the washer, substantially as shown and described.

2. The herein-described nut lock, comprising a nut formed with an opening, a washer also formed with an opening which is adapted to register with the opening in the nut, a screw-thread formed in the opening in the washer, and a locking pin formed with a tapered end, fitting in said openings, the screw-thread on the pin adapted to engage with the screw-thread in the opening in the washer, substantially as shown and described.

ELIJAH HAYS.

Witnesses:
A. G. WOOD,
F. E. BOWSER.